United States Patent
Nishida et al.

(10) Patent No.: US 6,691,012 B2
(45) Date of Patent: Feb. 10, 2004

(54) SHIFT CONTROL APPARATUS FOR CONTINUOUSLY VARIABLE TRANSMISSION AND SHIFT CONTROL METHOD THEREFOR

(75) Inventors: Masayuki Nishida, Tokyo (JP); Jun Nakayama, Tokyo (JP); Mitsuo Yamamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/367,720

(22) Filed: Feb. 19, 2003

(65) Prior Publication Data

US 2003/0158646 A1 Aug. 21, 2003

(30) Foreign Application Priority Data

Feb. 20, 2002 (JP) .......................................... 2002-043520

(51) Int. Cl.$^7$ ............................................... S16H 55/56
(52) U.S. Cl. ............................. 701/60; 701/51; 477/46; 477/48
(58) Field of Search ............................... 701/60, 58, 51; 477/36, 31, 34, 38, 44, 45, 46, 48, 49; 180/337

(56) References Cited

U.S. PATENT DOCUMENTS

| 5,928,301 | A | * | 7/1999 | Soga et al. | .................... 477/31 |
| 6,086,507 | A | * | 7/2000 | Luh | .............................. 477/48 |
| 6,250,077 | B1 | * | 6/2001 | Iino et al. | .................... 180/338 |
| 6,459,978 | B2 | * | 10/2002 | Taniguchi et al. | ............ 701/51 |
| 6,547,693 | B1 | * | 4/2003 | Bolz et al. | .................... 477/45 |

* cited by examiner

Primary Examiner—Richard M. Camby
(74) Attorney, Agent, or Firm—Smith, Gambrell & Russell LLP

(57) ABSTRACT

A shift control apparatus for a continuously variable transmission has a target primary pressure setting unit provided a target primary pressure according to a speed ratio deviation between an actual speed ratio and a target speed ratio; a shift control valve for regulating flow rate of hydraulic oil supplied to the primary cylinder by changing an opening area of the shift control valve according to current supplied to an electromagnetic coil; a primary pressure detecting unit; and a control unit for controlling the speed ratio by correcting a basic current set to be based upon the target primary pressure and supplied to the electromagnetic coil by feeding back the primary pressure detected by the primary pressure detecting unit, so as to have an excellent shift feeling, being able to decrease a fuel consumption by reducing the load of a pump and by quickly shifting to an optimum speed ratio.

14 Claims, 10 Drawing Sheets

FIG. 6A1
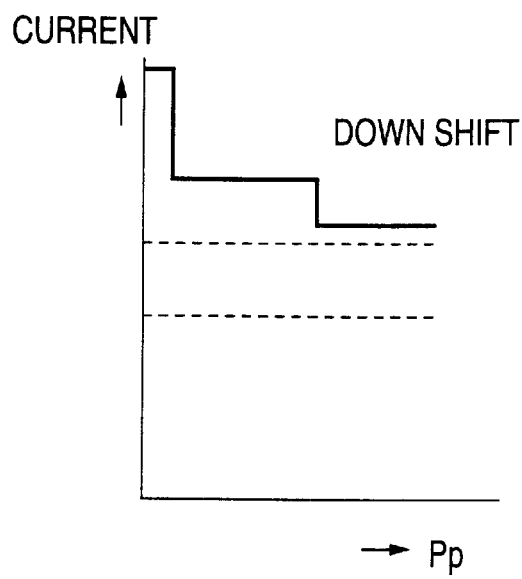
FIG. 6A2
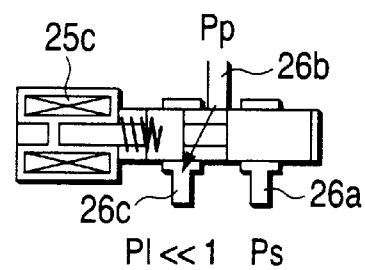
FIG. 6B1
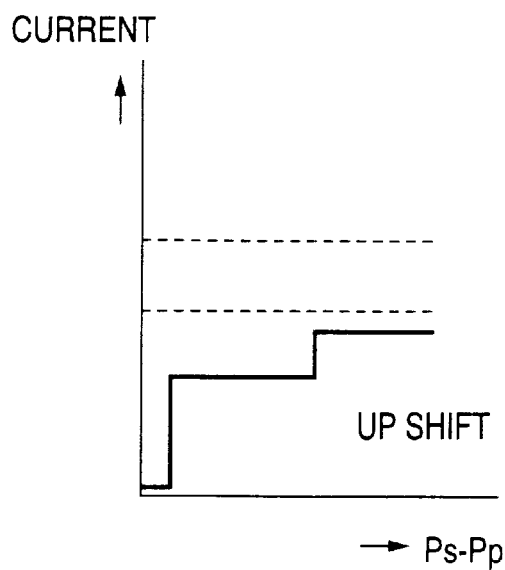
FIG. 6B2
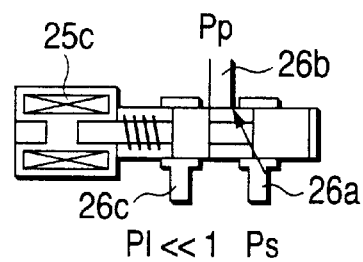

SHIFT CONTROL APPARATUS FOR CONTINUOUSLY VARIABLE TRANSMISSION AND SHIFT CONTROL METHOD THEREFOR

BACKGROUND OF THE INVENTION

1. Field of the Invention

The present invention relates to a control apparatus for a continuously variable transmission provided to attain a fast response ability of speed ratios, particularly to a shift control apparatus having a superior shift control feeling for effectively decreasing a fuel consumption by reducing a load of a pump and by quickly shifting to an optimum speed ratio.

2. Description of the Related Art

A belt-type continuously variable transmission (CVT) which is applied to a transmission of a vehicle has a primary pulley provided on a primary shaft which has a pulley groove of which width is variable and a secondary pulley provided on a secondary shaft which has the pulley groove of which width is variable comprising a belt round between the primary pulley and the secondary pulley. Changing pulley ratios or speed ratios on the primary pulley can continuously change a speed of the secondary shaft.

A primary cylinder with a primary oil chamber is provided in the primary pulley, and the groove width of the primary pulley changes with a volume of a hydraulic oil in the primary oil chamber, whereby the speed ratio is controlled. On the other hand, a secondary cylinder with a secondary oil chamber is provided in the secondary pulley, and a pushing force is transmitted is to the belt wound on the secondary pulley by controlling the volume of the hydraulic oil in the secondary oil chamber.

A shift control method for the continuously variable transmission has two types. A first method is to control the volume of the hydraulic oil in the primary oil chamber and the secondary oil chamber by oil pressure control valves, respectively, and a pressure of the hydraulic oil supplied to the primary oil chamber is directly controlled, whereby the speed ratios of the transmission are controlled. Then, a second method is to control the volume of the hydraulic oil is supplied in the primary oil chamber via a flow rate control valve, so that the amount of the hydraulic oil that flows in and out of the primary oil chamber is regulated, whereby the speed ratio of the transmission is controlled (as disclosed in the related art: JP-A-9-210189).

In the first method, the oil pressure supplied in the primary oil chamber is regulated by the oil pressure control valve for a shift control, and the oil pressure in the primary oil chamber is fed back to a pilot port of the oil pressure control valve. Therefore, when a torque is unexpectedly inputted to the transmission from the wheels due to a change of road surface conditions, for example, when the vehicle runs on a rough road or a road with other friction coefficients, the oil pressure control valve is actuated by an oil pressure feedback function from the pilot port, and the hydraulic oil is caused to flow out or in the primary oil chamber. Accordingly, the speed ratio become unstable. To solve this problem, an orifice or a value is provided in a hydraulic circuit. However, providing the value deteriorates the shift response at a normal time and hence lowers an upper limit of a shifting speed.

On the other hand, it becomes difficult to control the speed ratio, since with the first method it is not possible to estimate the speed ratio by measuring the amount of a hydraulic oil within the cylinder, while it is in generally impossible to detect the rotating speed for calculating the speed ratio when the rotating speed are low,in the control system in which the speed ratio is obtained through arithmetic operations by using rotating speed ratios between the two pulleys, i.e., the primary and secondary pulleys, in order to control the speed ratio.

In the second method, the amount of the hydraulic oil that flows in or out of the primary oil chamber is controlled by the flow rate control valve, and since the flow rate control valve cannot control a pressure, in particular, when attempting a quick shift, there occurs a possibility that the clamping force becomes too large or too small. This affects a durability of the belt and increases the possibility of a belt slippage. Then, in order to solve the problem, when the flow rate control valve is set on a safer side or the spool opening is narrowed to prevent the clamping force from becoming too large or too small when the shifting speed is lowered, resulting in deterioration in a shifting response ability.

In addition, since the flow rate control valve does not control the pressure, the phenomenon cannot be avoided in which a high pressure is generated in the hydraulic circuit for shifting to supply the hydraulic oil to the primary cylinder. Thus, it is needed to avoid this phenomenon, which is disadvantageous in costs. Furthermore, in case the flow rate control valve fails in a released condition, the speed ratio is fixed to the overdrive side, resulting in an insufficient drive force when the vehicle starts from a standstill.

On the other hand, as has been described above, in the control system in which the speed ratio is calculated from the rotating speed ratio between the two pulleys, i.e., the primary and secondary pulleys, in order to control the speed ratio, while it is generally impossible to detect the rotating speed for calculating the speed ratios when the rotating speed is low. In the second method, since the pressure within the cylinder cannot be controlled, it becomes difficult to quickly return the speed ratio to a low-speed side while preventing the occurrence of the belt slippage.

SUMMARY OF THE INVENTION

An object of the present invention is to provide a shift control apparatus for a continuously variable transmission which has a superior shift feeling.

Another object of the present invention is to provide the shift control apparatus for the continuously variable transmission which can reduce a fuel consumption by reducing a load of a pump.

A further object of the present invention is to provide the shift control apparatus for the continuously variable transmission which can reduce the fuel consumption by quickly shifting to an optimum speed ratio.

According to an aspect of the present invention, there is provided the shift control apparatus for the continuously variable transmission having a primary pulley in a primary cylinder and a secondary pulley in a secondary cylinder, whereby a continuously variable shifting is achieved by changing a diameter of the pulleys by supplying a primary pressure into the primary cylinder, including: a target primary pressure setting unit provided a target primary pressure according to a speed ratio deviation between an actual speed ratio between the primary pulley and the secondary pulley and a target speed ratio according to running conditions of a vehicle; a shift control valve for regulating a flow rate of the hydraulic oil supplied to the primary cylinder by changing an opening area of the shift control valve according to an electric current supplied to an electromagnetic coil; a primary pressure detecting unit for detecting the primary pressure supplied to the primary cylinder; and a control unit for controlling the speed ratio by correcting a basic current based upon a target primary pressure and supplied to the electromagnetic coil by feeding back the primary pressure detected by the primary pressure detecting unit.

According to another aspect of the present invention, there is provided the shift control apparatus for the continuously variable transmission, wherein the target primary pressure is set by an oil pressure ratio and a speed ratio deviation, the oil pressure ratio being between a primary pressure in a steady state corresponding to a target speed ratio and a secondary pressure supplied to the secondary cylinder.

According to a further aspect of the present invention, there is provided the shift control apparatus for the continuously variable transmission, wherein the target primary pressure is set by adding a compensation value calculated by a parameter representing an operating condition such as the speed ratio deviation.

According to the other aspect of the present invention, there is provided the shift control apparatus for the continuously variable transmission, wherein the feedback correction of the primary pressure detected by the primary pressure detecting unit is unexecuted when the variation rate of the target primary pressure is smaller than a predetermined value and when the pressure deviation between the target primary pressure and an actual primary pressure is equal to or smaller than a predetermined value.

According to the other aspect of the present invention, there is provided the shift control apparatus for the continuously variable transmission, wherein the feedback correction of the primary pressure detected by the primary pressure detecting unit is unexecuted when the variation rate of the target speed ratio is smaller than a predetermined value and when the speed ratio deviation between the target speed ratio and the actual speed ratio is equal to or smaller than the predetermined value.

According to the other aspect of the present invention, there is provided the shift control apparatus for the continuously variable transmission, wherein a current resulted from adding a feedback compensation current obtained by the pressure deviation between the target primary pressure and the actual primary pressure is supplied to the shift control valve.

According to the other aspect of the present invention, there is provided the shift control apparatus for the continuously variable transmission, wherein the shift control valve is closed when the variation rate of the target primary pressure is equal to or smaller than the predetermined value, whereas the opening area of the shift control valve is regulated according to the variation rate when the variation rate is equal to or larger than the predetermined value.

According to the other aspect of the present invention, there is provided the shift control apparatus for the continuously variable transmission, wherein the opening area is regulated by limiting the current supplied to the electromagnetic coil so as to avoid an excessive shifting speed.

According to the other aspect of the present invention, there is provided the shift control apparatus for the continuously variable transmission, wherein the current is limited according to the primary pressure.

According to the other aspect of the present invention, there is provided the shift control apparatus for the continuously variable transmission, wherein an oil pressure limiting unit for limiting the primary pressure supplied to the primary cylinder is provided in a primary oil passage connected to the primary cylinder, the oil pressure limiting unit inhibits that the primary pressure supplied to the primary cylinder exceeds the predetermined value.

According to another aspect of the present invention, there is provided the shift control apparatus for the continuously variable transmission, wherein the oil pressure limiting unit is a relief valve.

According to the other aspect of the present invention, there is provided the shift control apparatus for the continuously variable transmission, wherein the oil pressure limiting unit is controlled by an output signal from the primary pressure detecting unit.

According to the other aspect of the present invention, there is provided the shift control apparatus for the continuously variable transmission, wherein the amount of the hydraulic oil flown in and out of the primary cylinder is estimated as an estimated valve by the opening area obtained from a relationship between the opening area and the current and the primary pressure when a vehicle is running at a low speed, and wherein the speed ratio is controlled based on the estimated value.

According to the other aspect of the present invention, there is provided a shift control method for a continuously variable transmission having a primary pulley with a primary cylinder and a secondary pulley with a secondary cylinder, whereby the continuously variable shifting is achieved by changing a winding diameter of a belt the primary and secondary pulleys, the method having steps of setting a target primary pressure according to a speed ratio deviation between an actual speed ratio between the primary pulley and the secondary pulley and a target speed ratio calculated according to running conditions of a vehicle, regulating a flow rate of a hydraulic oil supplied to the primary cylinder by changing an opening area of the shift control valve according to a current supplied to an electromagnetic coil, detecting the primary pressure supplied to the primary cylinder, and controlling the speed ratio by correcting a basic current based upon the target primary pressure and supplied to the electromagnetic coil by feeding back the primary pressure detected by the primary pressure detecting unit.

In the present invention, as the shift control valve, since the flow rate control valve in which the flow rate of the hydraulic oil to the primary cylinder is regulated by changing the opening area according to the current supplied to the electromagnetic coil is used, a speed ratio stability is ensured against an unexpected torque input change, and a quick change in the speed ratio can be achieved by obtaining a final target primary pressure from the target speed ratio. The occurrence of a belt slippage can be prevented by monitoring the primary pressure at any times by the primary pressure detecting unit, whereby the shift control can be realized for preventing the occurrence of the belt slippage, which is stable in shift and which can improve the shift response and a shift feeling.

The secondary pressure does not have to be set slightly high for safety when attempting to prevent the occurrence of the belt slippage at the time of shifting, and the oil pressure can be reduced, which then allows the load of the pump to be reduced, thereby making it possible to improve not only fuel consumption but also the durability of the belt.

Since a proper upper limit for the primary pressure can be maintained by the relief valve, the maximum pressure for the primary circuit at a downstream of the relief valve can be set low, and therefore, the transmission can be made light in weight and low in cost.

BRIEF DESCRIPTION OF THE DRAWINGS

FIG. 6A1 is a limiter processing characteristics chart showing the relationship between a primary pressure and a current value;

FIG. 6A2 is the sectional view showing the operating condition of a shift control valve according to the characteristics shown in FIG. 6A1;

FIG. 6B1 is a limiter processing characteristics chart showing the relationship between a difference between a primary pressure and a secondary pressure and an electric value, FIG. 6B2 is a sectional view showing the operating condition of a shift control valve according to the characteristics shown in FIG. 6B1;

DETAILED DESCRIPTION OF THE PREFERRED EMBODIMENT

Figure 1:
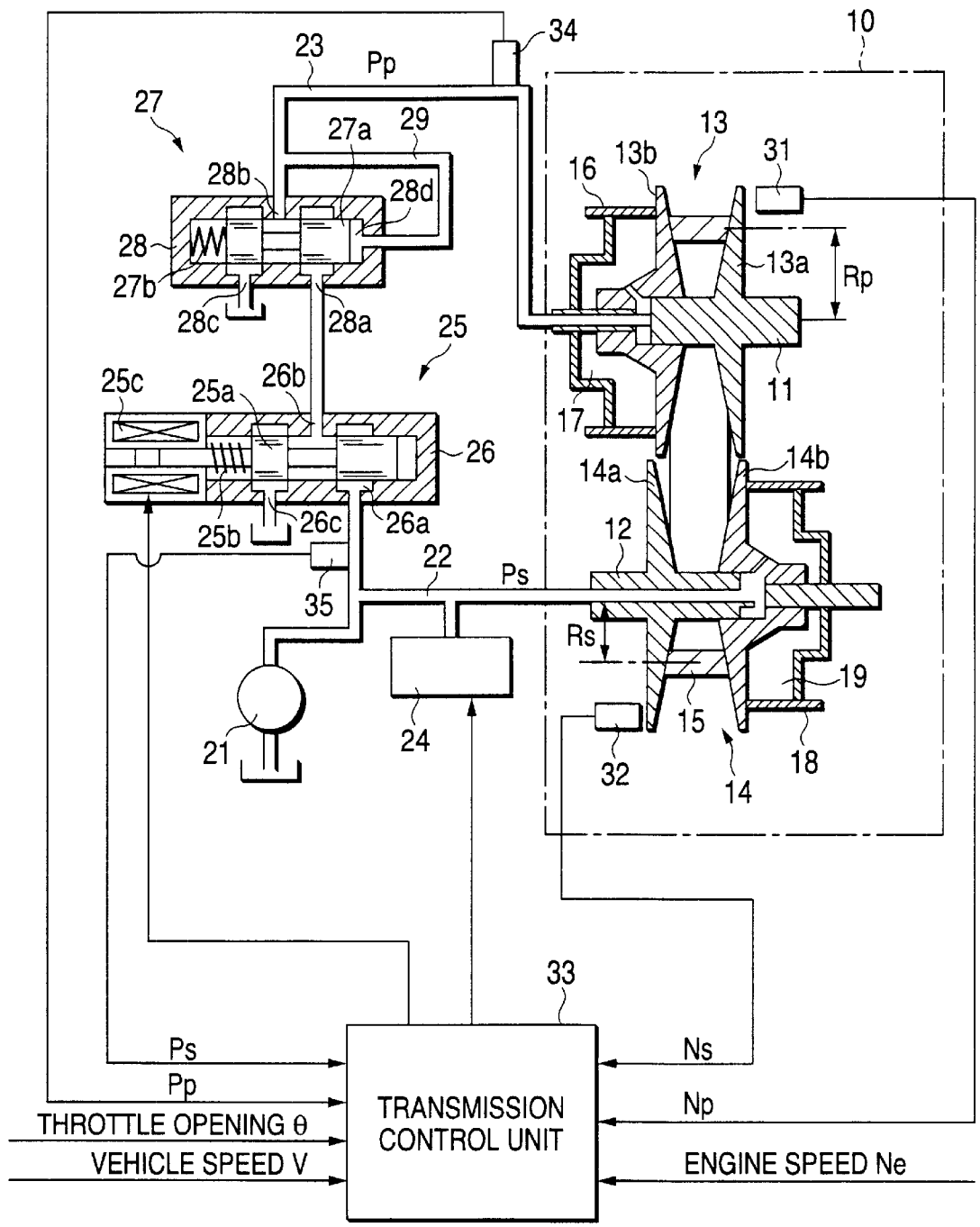
FIG. 1 is a schematic diagram showing a shift control apparatus for a continuously variable transmission according to an embodiment of the present invention.

An embodiment of the present invention will be described in detail below based on the accompanying drawings. FIG. 1 is a schematic diagram showing a controlling apparatus for a continuously variable transmission according to the embodiment of the present invention, and the continuously variable transmission 10 has a primary shaft 11 to which a rotation of a crankshaft driven by an engine is transmitted via a torque converter and a forward and reverse changeover apparatus and a secondary shaft 12 which is disposed in parallel with the primary shaft 11.

A primary pulley 13 is provided on the primary shaft 11 and has a fixed half pulley 13a which is integrally attached to the primary shaft 11 and a movable half pulley 13b which faces the fixed half pulley 13a and which is attached to the primary shaft 11 in such a manner as to slide axially on linear ball splines, with a gap between inclined surfaces of the two coned half pulleys or the width of a pulley groove being variable. A secondary pulley 14 is provided on the secondary shaft 14 and has a fixed half pulley 14a which is integrally attached to the secondary shaft 12 and a movable half pulley 14b which faces the fixed half pulley 14a and which is attached to the secondary shaft 12, as with the movable half pulley 13b, in such a manner as to slide axially on the linear ball splines, with the width of a pulley groove being variable.

A belt 15 is provided to extend for winding between the primary pulley 13 and the secondary pulley 14, and a ratio of contacting diameters of the two pulleys 13, 14 varies by changing groove widths of the respective pulleys, whereby a rotating speed of the secondary shaft 12 changes continuously. When it is assumed that a contact diameter of the belt 15 with the primary pulley 13 is Rp and that the contact diameter of the belt 15 with the secondary pulley 14 is Rs, then speed ratios or pulley ratios i is represented as i=Rs/Rp. The rotation of the secondary shaft 12 is designed to be transmitted to drive wheels via reduction gears and a differential.

A primary cylinder 16 is mounted on the primary pulley 13 for varying the groove width of the primary pulley 13, and a primary oil chamber 17 is formed within the cylinder 16. In addition, a secondary cylinder 18 is mounted on the secondary pulley 14 for varying the groove width of the secondary pulley 14, and a secondary oil chamber 19 is formed within the secondary cylinder 18.

A hydraulic oil within an oil pan is supplied to the respective oil chambers 17, 19 by an oil pump 21 which is driven by the engine or an electric motor. A delivery port of the oil pump 12 communicates with the secondary oil chamber 19 and the primary oil chamber 17 via a line pressure oil passage, i.e., a secondary oil passage 22 and a primary oil passage 23, respectively.

The secondary oil passage 22 communicates with a secondary pressure port of a secondary pressure control valve 24, and a secondary pressure Ps that is supplied to the secondary oil chamber 19 is regulated to a pressure corresponding to a transmission capacity required by the belt 15 by the secondary pressure control valve 24. Namely, when a large power is required such as the secondary pressure Ps is increased to prevent an occurrence of a belt slippage when the vehicle climbs up a slope or starts from a stopping condition, whereas the secondary pressure Ps is reduced to improve an efficiency of the oil pump 21 and the transmission when a small power is required. A shift control valve 25 is provided in the primary oil passage 23 which is connected to the secondary oil passage 22, and the hydraulic oil at a primary pressure Pp is supplied to the primary oil chamber 17 via the shift control valve 25, whereby the groove width of the primary pulley 13 changes and a pulley ratio is controlled.

The shift control valve 25 has a valve housing 26 with an inlet port 26a to which the secondary oil passage 22 is connected, an outlet port 26b which communicates with the primary oil passage 23 and a delivery port 26c. A spool 25a is provided in the valve housing 26 for changing opening areas of the inlet port 26a and the delivery port 26c. A coil spring 25b is assembled in the valve housing 26 for urging a spring force to the spool 25a in a direction which the opening area of the inlet port 26a is increased, and provided with a solenoid unit in the valve housing 26 where an electromagnetic coil 25c is assembled for urging a thrust force to the spool 25a in a direction which the opening area of the inlet port 26a is reduced against the spring force applied by the coil spring 25b. Consequently, the opening areas of the inlet port 26a and the delivery port 26c of the shift control valve 25 are regulated by the electric current supplied to the electromagnetic coil 25c, whereby the flow rate of the hydraulic oil is controlled to discharge from the primary oil chamber 17 via the primary oil passage 23.

A relief valve 27 is provided as an oil pressure limiting unit in the primary oil passage 23 for limiting an upper limit value for an oil pressure supplied to the primary oil chamber 17. The relief valve 27 has a valve housing in which are provided an inlet port 28a communicating with the outlet port 26b of the shift control valve 25, an outlet port 28b communicating with the primary oil chamber 17 and a drain port 28c. A spool 27a is provided in the valve housing 28 for switching over the communicating conditions of the ports. The outlet port 28b and a pilot port 28d communicate with each other by a pilot oil passage 29, and a pilot pressure is applied to the spool 27a. Consequently, a pressure is applied to the spool 27a by a pilot pressure supplied from the pilot port 28d in a direction which the communication between the inlet port 28a and the outlet port 28b is cut off. On the other hand, a coil spring 27b is assembled within the valve housing 28 for applying a spring force in a direction in which the communication is opened.

A primary speed sensor 31 is provided in the vicinity of the primary pulley 13 for detecting the primary speed Np of the primary pulley 13, and a secondary speed sensor 32 is provided in the vicinity of the secondary pulley 14 for detecting the secondary speed Ns of the secondary pulley 14, and detected signals from the sensors 31, 32 are sent to a transmission control unit 33. A primary pressure sensor 34 is provided in the primary oil passage 23 for detecting a primary pressure Pp in the primary oil chamber 17, and a secondary pressure sensor 35 is provided in the secondary oil passage 22 for detecting a secondary pressure Ps that is supplied to the secondary oil chamber 19, and the detected signals from the sensors 34, 35 are sent to the transmission control unit 33.

Furthermore, signals corresponding to a throttle opening θ, a vehicle speed V and an engine speed Ne are sent to the transmission control unit 33 from a throttle opening sensor, a vehicle speed sensor and an engine speed sensor, respectively, which are not shown. However, the vehicle speed are calculated from the rotating speed of the secondary pulley 14 detected by the secondary rotating speed sensor 32. Control signals are sent to the electromagnetic coils of the secondary pressure control valve 24 and the shift control valve 25 from the transmission control unit 33. Provided in the transmission control unit 33 are a microprocessor (CPU) for processing signals from the various sensors, a ROM for storing a control program, arithmetic operation formulae, map data or the like and a RAM for temporarily storing data.

Figure 2:
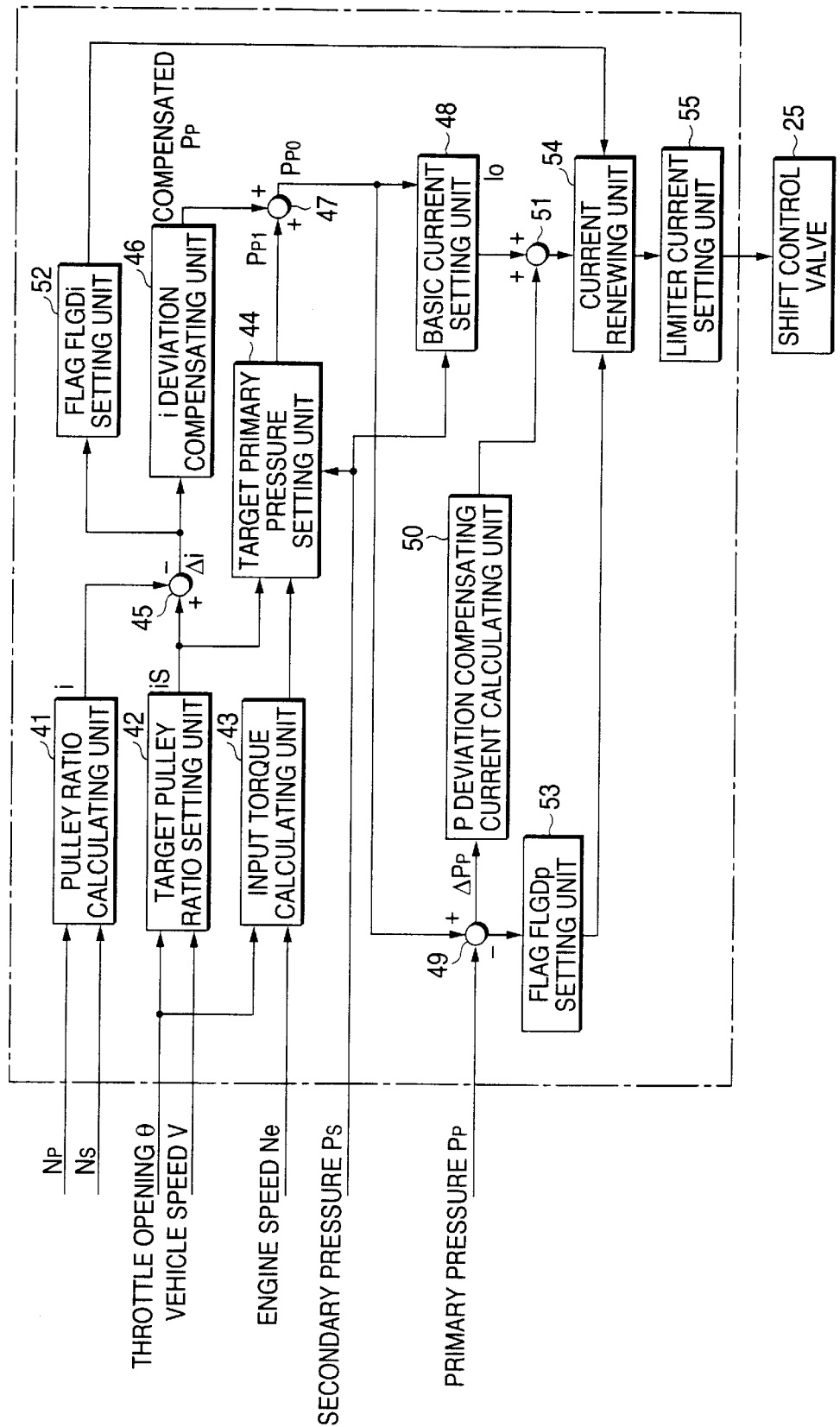
FIG. 2 is a block diagram showing a control circuit for a shift control valve.

FIG. 2 is a block diagram showing a control circuit of the shift control valve provided in the transmission control unit 33, and in FIG. 2, respective blocks are illustrated as respective functions are shown. A pulley ratio calculating unit 41 shown in FIG. 2 calculates an actual speed ratio or a real pulley ratio "i" based upon the primary speed Np and the secondary speed Ns. A target pulley ratio setting unit 42 calculates a primary rotating speed Npd based upon the throttle opening θ and the vehicle speed V and determines a target pulley ratio "is" by those conditions. In addition, a target line pressure or a secondary pressure Ps is calculated based upon the throttle opening θ and the engine speed Ne, and a required line pressure per an unit torque according to the real speed ratio "i".

An input torque calculating unit 43 calculates an engine torque that is inputted into the primary pulley 13 based upon the throttle opening θ and the engine speed Ne or an input torque Tin. A target primary pressure setting unit 44 calculates a target primary pressure Ppl in a steady state based upon the target pulley ratio "is", the input torque ratio Tin and the secondary pressure Ps. The target primary pressure Ppl is obtained by multiplying the oil pressure ratio Pp/Ps between the primary pressure Pp and the secondary pressure Ps.

Figure 3:
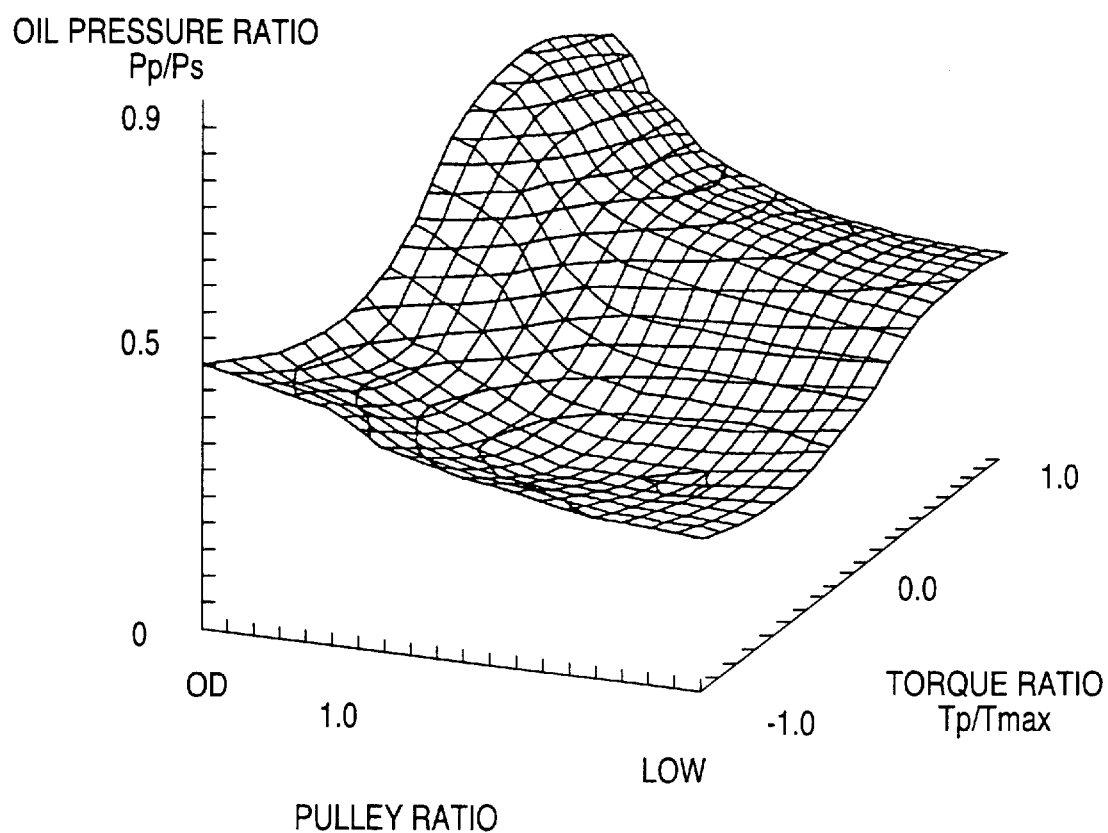
FIG. 3 is a characteristics chart showing an example of map data for oil pressure ratio characteristics stored in a memory using a target pulley ratio and a torque ratio as parameters.

The oil pressure ratio Pp/Ps is obtained by reading the map data stored in advance in a memory based upon the target pulley ratio "is" and a torque ratio Tp/Tmax. FIG. 3 is an example of the map data showing the properties of the oil pressure ratio Pp/Ps stored in advance in the ROM using the target pulley ratio "is" and the torque ratio Tp/Tmax as parameters in order to obtain a target primary pressure Ppl in the steady state. In FIG. 3, Tp denotes an input torque applied to the primary shaft 11, and Tmax denotes a maximum transmissible torque which is obtained using the secondary pressure Ps and the target pulley ratio "is" as parameters.

On the other hand, as shown in FIG. 2, a pulley ratio deviation Δi between the real pulley ratio "i" and the target pulley ratio "is" is obtained by a subtracting unit 45, and the deviation Δi so obtained is sent to a pulley ratio deviation compensating unit 46. The deviation compensating unit 46 calculates a compensating value for the primary pressure Pp which eliminates the deviationai through a PID correction based upon the pulley ratio deviation Δi. The compensating value is added to the target primary pressure Ppl in an adding unit 47 to obtain a zero degree target primary pressure Pp0. A basic current setting unit 48 sets a basic current I0 that is supplied to the electromagnetic coil 25c of the shift control valve 25 based upon the zero degree target primary pressure Pp0 and the secondary pressure Ps.

Figure 4A:
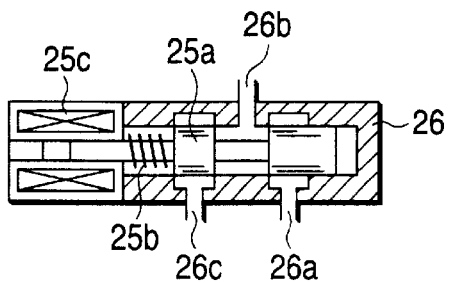
FIG. 4A is a sectional view showing the shift control valve which is enlarged.
Figure 4B:
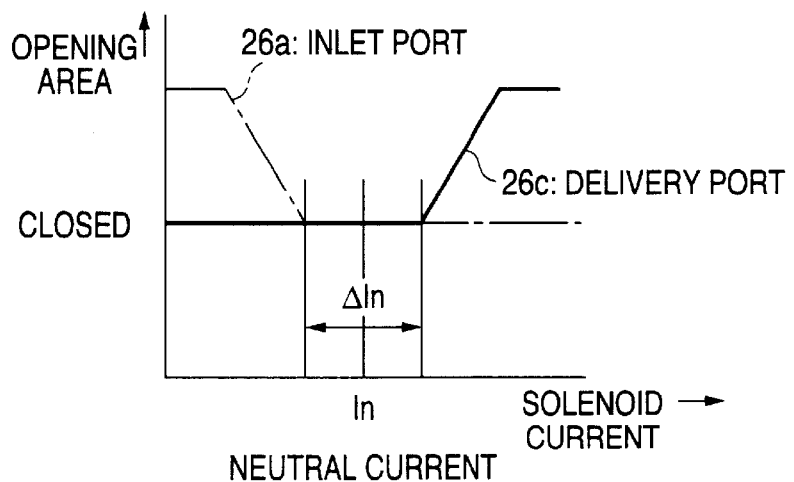
FIG. 4B is a valve characteristics chart showing a relationship between a solenoid current supplied to the shift control valve and opening areas of ports.
Figure 4C:
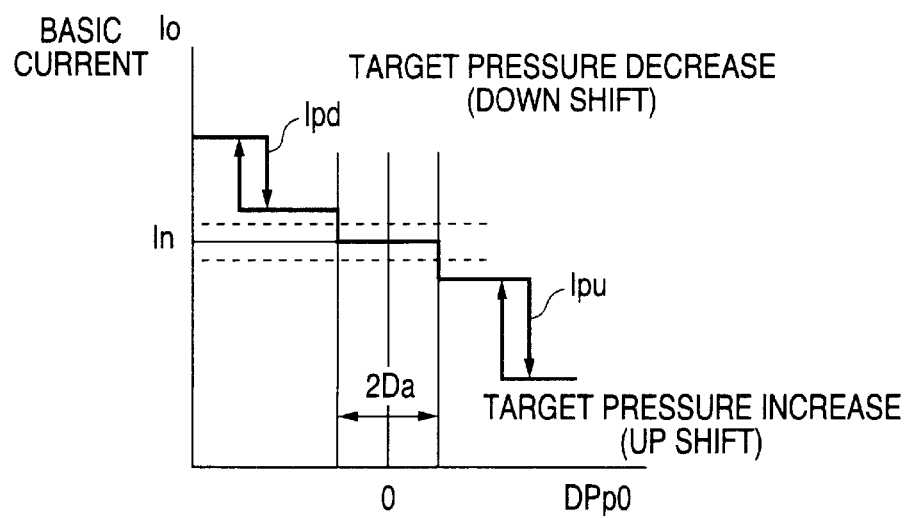
FIG. 4C is a basic current characteristics chart showing the relationship between the variation rate of a target primary pressure and a basic current.

FIG. 4A is a sectional view showing an enlarged view of the shift control valve 25, FIG. 4B is a valve characteristics chart showing the relationship between a solenoid current supplied to the electromagnetic coil 25c of the shift control valve 25 and the opening areas of the ports 26a, 26c, and FIG. 4C is a basic current characteristics chart showing the relationship between the variation rate DPp0. of the target primary pressure Pp0 and the basic current I0.

As shown FIG. 4B, the solenoid current supplied to the electromagnetic coil 25c is within a predetermined neutral range ΔIn relative to a neutral current In, the inlet port 26a and the delivery port 26c of the shift control valve 25 are put in a closed condition, respectively. When a solenoid current value exceeds the neutral range ΔIn, the opening area of the delivery port 26c increases, and the hydraulic oil flows from the primary oil chamber 17, whereby the groove width of the primary pulley 13 expands, and the speed ratio changes to an upshift side.

The basic current setting unit 48 calculates the variation rate DPp0 of the target primary pressure Pp0 and sets the basic current I0 according to the variation rate DPp0. As shown in FIG. 4C, even in case either the variation rate DPp0 increases or decreases, in case the variation rate DPp0 stays within a predetermined threshold 2Da, the basic current I0 is set at the neutral current In. Then, in case the variation rate DPp0 increases to reach or exceed the threshold, the basic current I0 is set to a current Ipu which is lower than the neutral current In, whereby the inlet port 26a of the shift control valve 25 opens to allow the hydraulic oil to flow into the primary cylinder 16, and the speed ratio changes to the upshift side. On the contrary to this, in case the variation rate DPp0 decreases to lower than the threshold, the basic current is set to a current Ipd which is higher than the neutral current In, and the speed ratio changes to a downshift side. In either of the cases, the currents Ipu, Ipd change with hysteresises.

Figure 5A:
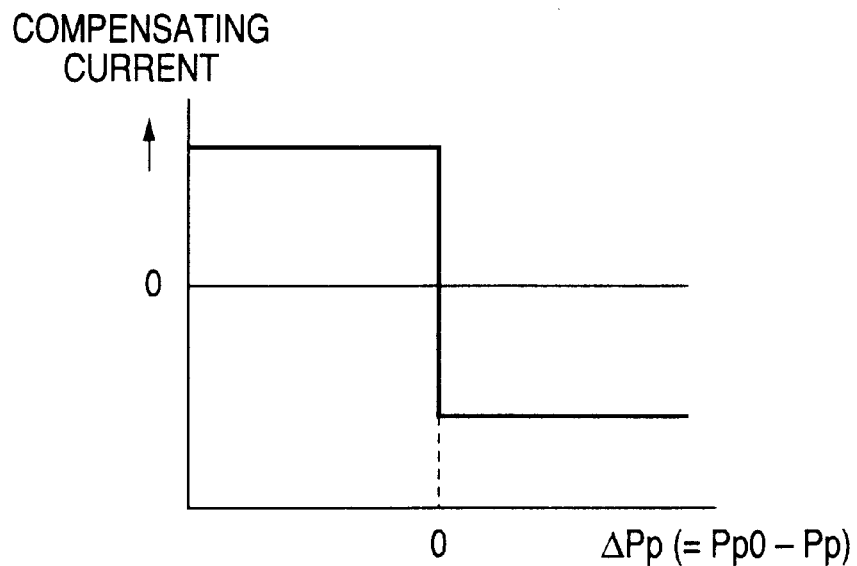
FIG. 5A is the compensating current characteristics chart showing an example of a compensating current value according to a pressure deviation.
Figure 5B:
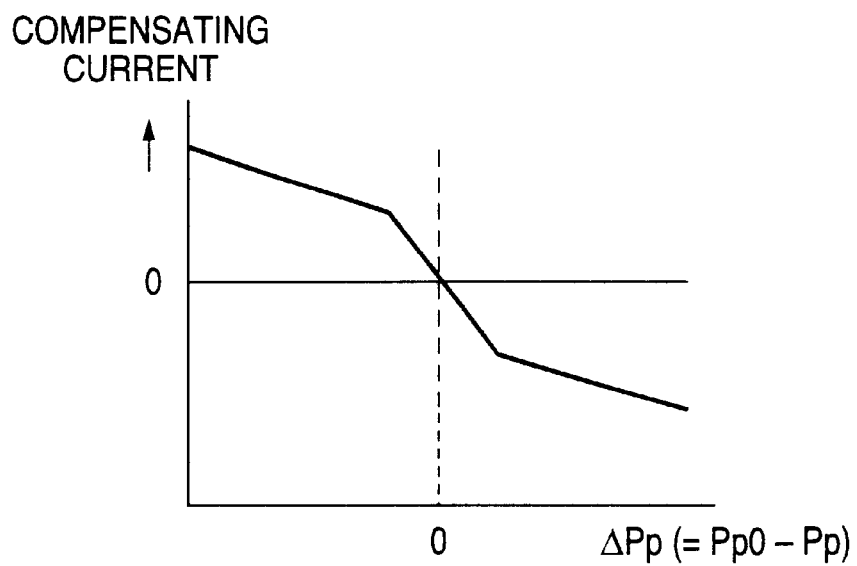
FIG. 5B is a compensating current characteristics chart showing another example of the compensating current value according to another pressure deviation.

As shown in FIG. 2, the actual primary pressure Pp obtained by the primary pressure sensor 34 shown in FIG. 1 and the target primary pressure Pp0 is compared to each other by the subtracting unit 49 to obtain a pressure deviation $\Delta$Pp, which is then sent to a P deviation compensating current calculating unit 50. The P deviation compensating current calculating unit 50 calculates a compensating current according to the pressure deviation $\Delta$Pp. FIGS. 5A, 5B are compensating current characteristics charts, respectively, showing examples of compensating current values according to the pressure deviation $\Delta$Pp, and the compensating current values according to the pressure deviation $\Delta$Pp are added to the basic current I0 at an adding unit 51 and are then supplied to the electromagnetic coil 25c of the shift control valve 25. Thus, the basic current I0 is a feedback control according to the primary pressure Pp detected by the primary pressure sensor 34.

A flag FLGDi setting unit 52 shown in FIG. 2 sets a flag depending upon whether or not a speed ratio deviation $\Delta$i exceeds a predetermined threshold D$\Delta$i, and a flag FLGDp setting unit 53 sets the flag depending upon whether or not the pressure deviation $\Delta$Pp exceeds a predetermined threshold D$\Delta$Pp. Signals from the respective flag setting units 52, 53 are sent to a current renewing unit 54. Then, in case the flags are set at the respective flag setting units 52, 53 on condition that an absolute valve of the variation rate DPp0 of the target primary pressure Pp0 is smaller than a threshold Da, the setted basic current I0 is supplied to the electromagnetic coil 25c as it is without being renewed or with no feedback control of the primary pressure Pp being carried out. On the contrary to this, in other cases than the case described above, the current values I0 are renewed and the primary pressure Pp is fed.

A limiter current setting unit 55 executes a limiter process of a current value supplied to the electromagnetic coil 25c to limit the opening area of the ports of the shift control valve 25. FIG. 6A1 is a limiter processing characteristics chart showing the relationship between the primary pressure Pp and a current, and FIG. 6A2 is a sectional view showing an operating condition of the shift control valve 25 according to the characteristics shown in FIG. 6A1. FIG. 6B1 is a limiter processing characteristics chart showing the relationship between a difference between the secondary pressure Ps and the primary pressure Pp and a current value, and FIG. 6B2 is a sectional view showing an operating condition of the shift control valve 25 according to the characteristics shown in FIG. 6B1.

As shown in FIG. 6A1, when the primary pressure Pp increases, the current value is controlled to decrease step wisely so that the opening area of the delivery port 26c increases, whereby the solenoid current is limited such that the speed ratio stays on the downshift side as the primary pressure Pp becomes higher. On the other hand, as shown in FIG. 6B1, as a value resulting from Ps-Pp becomes larger, the current value is controlled to increase step wisely so that the opening area of the inlet port 26a increases, whereby the solenoid current is controlled such that the speed ratio stays on the upshift side as the pressure difference becomes larger.

Figure 7:
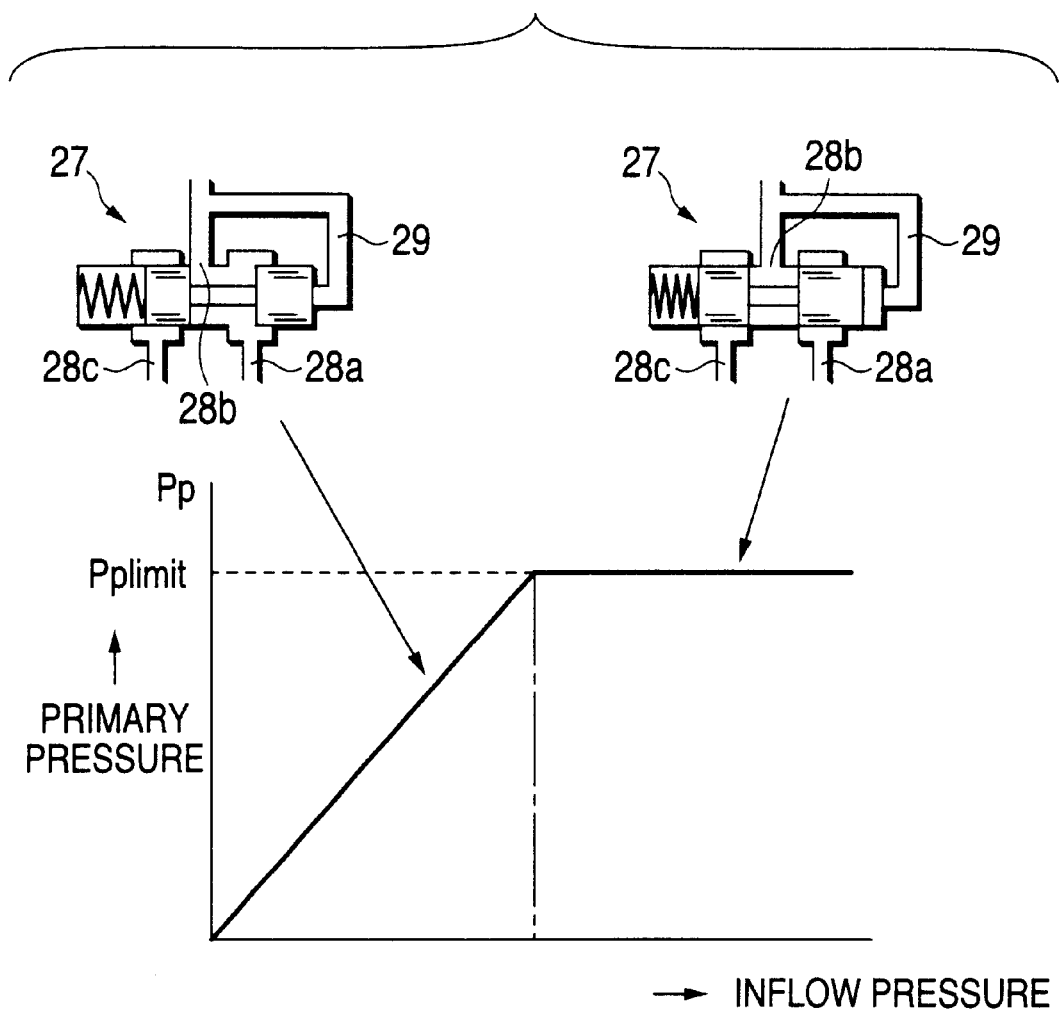
FIG. 7 is an operation characteristics chart of a relief valve functioning as an oil pressure limiting unit.

FIG. 7 is an operating characteristics chart of the relief valve 27 which functions as the oil pressure limiting unit, which shows that the primary pressure Pp continues to increase correspondingly to an increase in inflow pressure until an inflow pressure flowing into the inlet port 28a exceeds an upper limit value Pp limit. Then, when a pressure exceeding a predetermined upper limit value Pp limit flows into the inlet port 28a the inlet port 28a is closed by a pilot pressure to prevent an increase in the primary pressure Pp, whereby in case an actual primary pressure becomes higher than a predetermined primary pressure, the primary pressure is lowered to a proper value by the relief valve 27 as an oil pressure limiter. Consequently, there is no risk that an abnormally high pressure acts on the primary oil passage 23, the circuit being thereby protected. Furthermore, even in case the shift control valve 25 fails to stay on the open side by selecting a set value appropriately, the pulley ratio can be maintained at an intermediate ratio between the overdrive and the low.

In the continuously variable transmission described above, the pulley ratios or speed ratios are automatically controlled by detecting the running conditions of the vehicle through the various types of sensors and by controlling the solenoid current supplied to the electromagnetic coil 25c of the shift control valve 25. The basic current supplied to the electromagnetic coil 25c is set based upon the target primary pressure Pp0 and the secondary pressure Ps, as well as the variation rate of the target primary pressure Pp.

Figure 8:
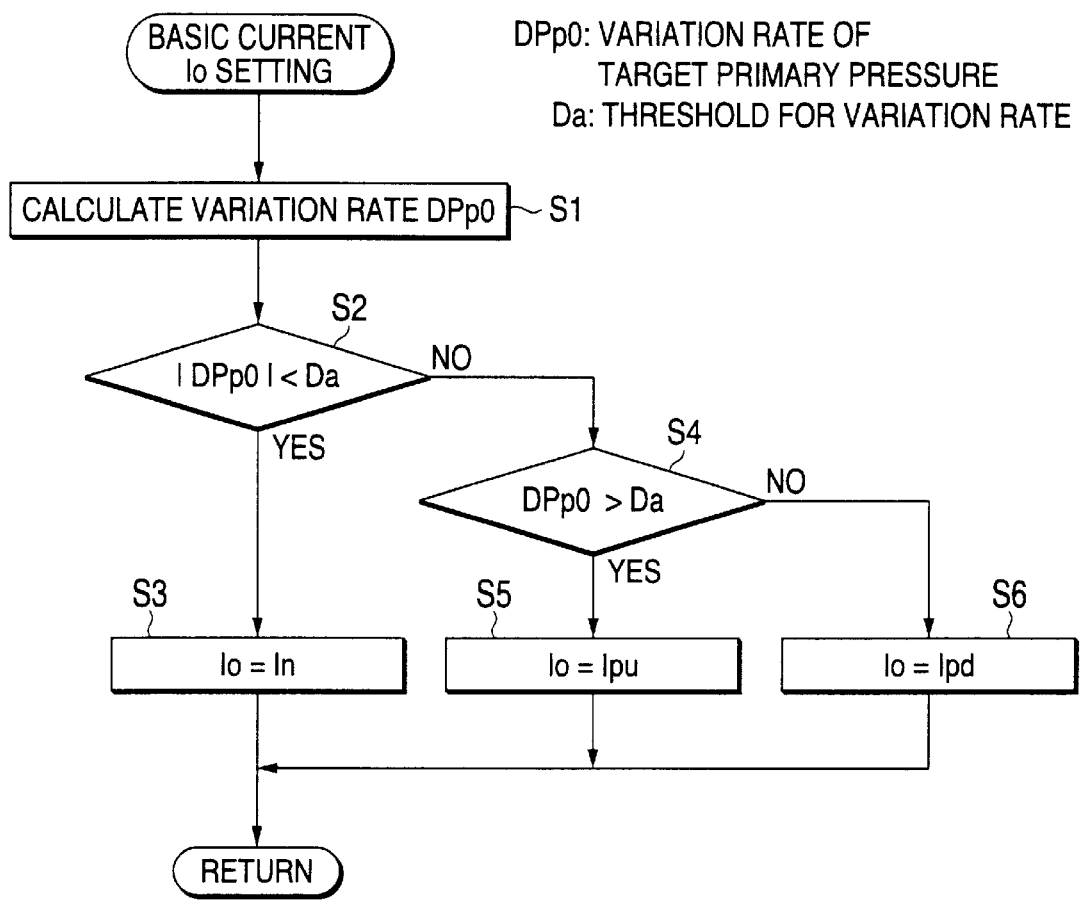
FIG. 8 is a flowchart showing a basic current setting routine.

FIG. 8 is a flowchart showing a basic current setting routine provided the basic current I0, and in step S1, the variation rate DPp0 of the target primary pressure Pp0 is calculated. While the target primary pressure Pp0 is compensated according to the speed ratio deviation $\Delta$i, a compensating value maybe calculated from parameters representing the operating conditions of the continuously variable transmission such as the actual pulley ratio, the pulley speed, the secondary oil pressure and the transmission torque.

Next, in step S2, whether or not the absolute value of the variation rate DPp0 is equal to or smaller than the threshold Da is determined, and in case the variation rate is small, step S3 is implemented to set the basic current I0 to the neutral current In. As this condition occurs, both the inlet port 26a and the delivery port 26c of the shift control valve 25 are put in the closed condition.

In case the absolute value of the variation rate is determined as exceeding the threshold Da in step S2, in step S4, whether or not the variation rate DPp0 is larger than the threshold Da is determined. In case the variation rate is determined as being larger than the threshold, then step S5 is implemented to set the basic current I0 to Ipu, as shown in FIG. 4C, so as to increase the target primary pressure Pp0. On the contrary, in case the variation rate DPp0 is determined as being smaller than the threshold Da, step S6 is then implemented to set the basic current I0 to Ipd, as shown in FIG. 4c, so as to decrease the target primary pressure Pp0.

Thus, the opening areas of the ports of the shift control valve 25 is varied according to the current values supplied to the electromagnetic coil 25c, and the pulley ratios are automatically controlled. The basic current supplied to the electromagnetic coil 25c is corrected by feeding back the primary pressure detected by the primary pressure sensor 34. However, the feedback control is implemented only when predetermined conditions are met.

Figure 9:
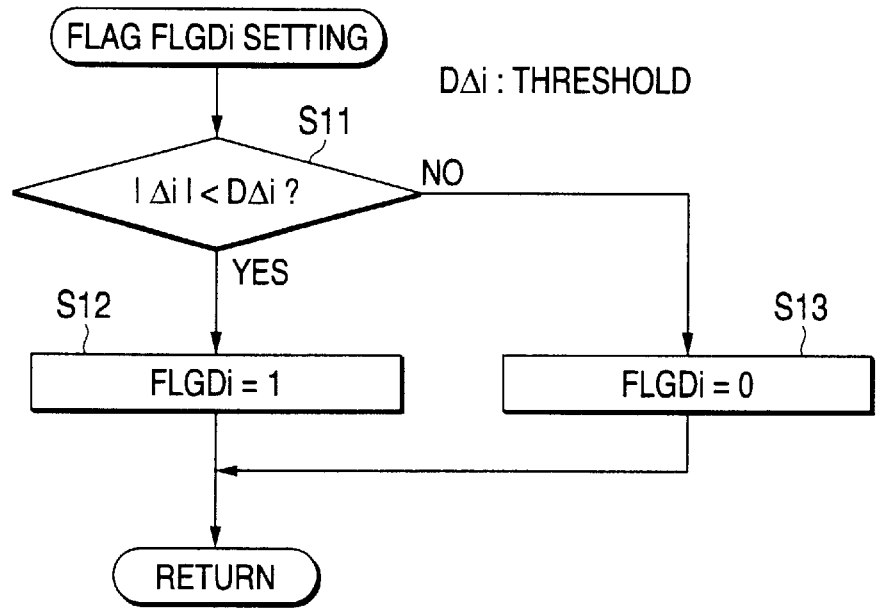
FIG. 9 is the flowchart showing a flag FLGDi setting routine.
Figure 10:
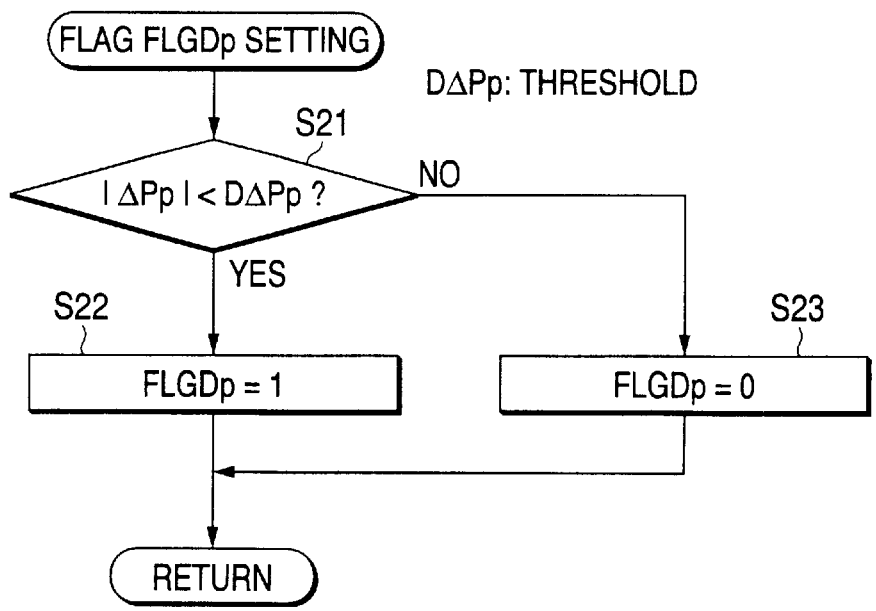
FIG. 10 is the flowchart showing a flag FLDGp setting routine.
Figure 11:
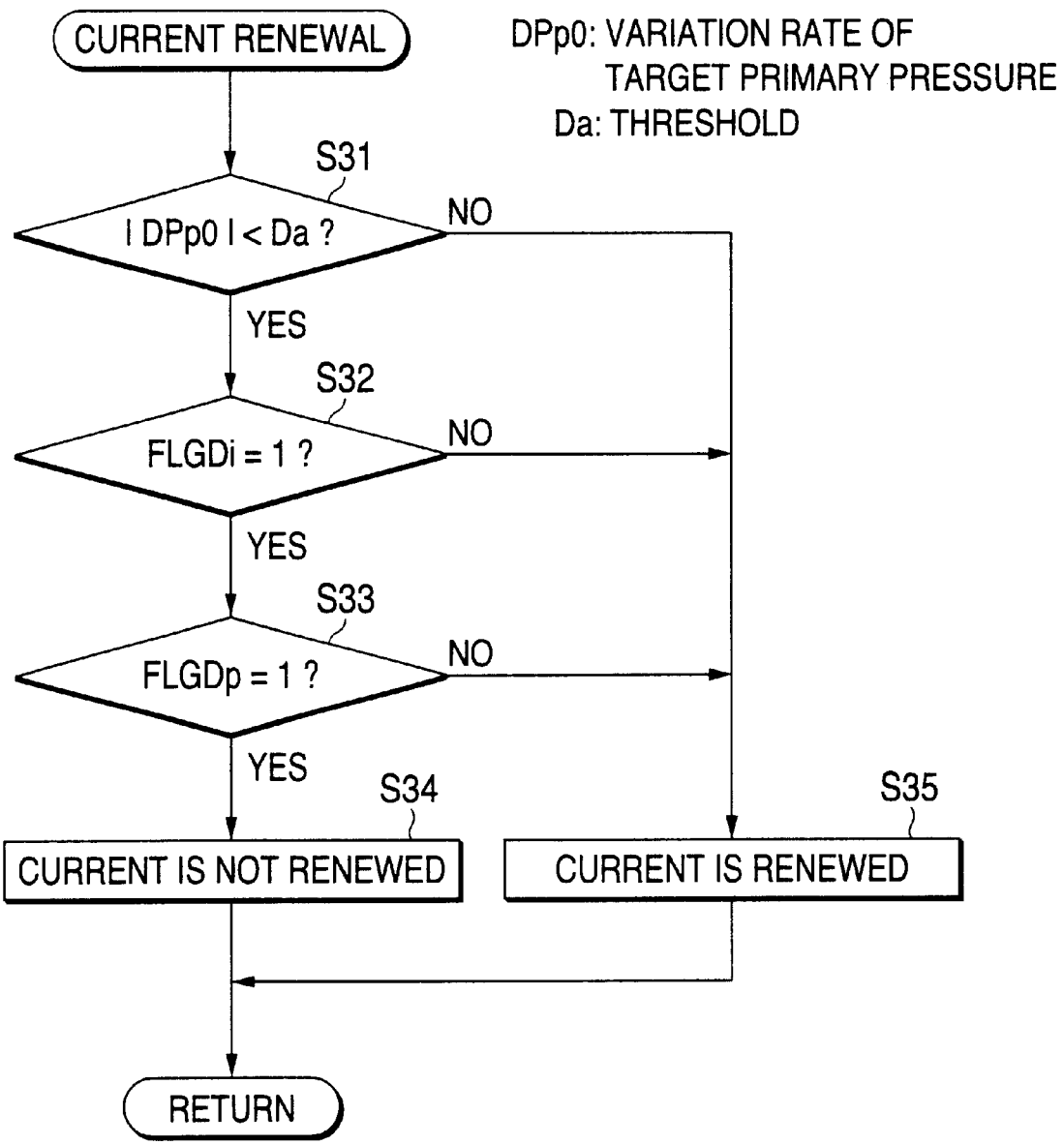
FIG. 11 is the flowchart showing a current value renewing routine.

A flag FLGDi setting routine shown in FIG. 9, a flag FLGDp setting routine shown in FIG. 10 and a current renewing routine shown in FIG. 11 are carried out in order to determine whether or not a feedback control needs to be implemented.

In step S11 shown in FIG. 9, whether or not an absolute value of the pulley ratio deviation Δi between the actual pulley ratio "i" and the target pulley ratio "is" is smaller than the predetermined threshold DΔi. In case the deviation Δi is determined as being equal to or smaller than the threshold Da, then in step S12, a flag is set, whereas in case the deviation is determined as being equal to or larger than the threshold, then a flag is reset in step S13. In step S21 shown in FIG. 10, whether or not the absolute value of the pressure deviation ΔPp between the actual pressure Pp and the target primary pressure Pp0 is smaller than a predetermined threshold DΔPp is determined. In case the pressure deviation ΔPp is determined as being equal to or smaller than the threshold DΔPp, then in step S22, a flag is set, whereas the pressure deviation ΔPp is determined as being equal to or larger than the threshold DΔPp, then in step S23, the flag is reset.

In step S31 shown in FIG. 11, whether or not the absolute value of the variation rate DPp0 of the target primary pressure Pp0 is smaller than the threshold Da is determined, and in steps S32,S33, whether or not the flags FLGDi and FLGDp are set is determined, respectively. In a case the questions are determined as affirmative in the steps S31 to S33, in other words, in case the absolute value of the variation rate DPp0 of the target primary pressure Pp0 is smaller than the threshold, the absolute value of the pulley ratio deviation Δi is smaller than the threshold DΔi, and the absolute value of the pressure deviation ΔPp is smaller than the threshold DΔPp, step S34 is then implemented. Then the shift control valve 25 is controlled without renewing the current or without correcting the basic current by feeding back the detection results of the primary pressure Pp.

In contrast to what is described above, in case the questions are determined negatively in steps S31 to S33, step S35 is then implemented. Then the current value is renewed for correcting the basic current by feeding back the detection results of the primary pressure Pp.

As has been described above, since the opening areas are regulated by detecting the actual primary pressure Pp from the primary pressure sensor 34 and supplying the drive current to the electromagnetic coil 25c, even if the detection of the pulley ratios which detected the primary rotating speed Np and the secondary rotating speed Ns is difficult depending on signals from the primary rotating speed sensor 31 and the secondary rotating speed sensor 32, shift control can be achieved by estimating speed ratios by monitoring the primary pressure Pp, and monitoring the drive current supplied when the vehicle runs at an extremely low speed. At the same time, the shift control valve 25 can be controlled such that the primary pressure Pp does not become too low, whereby the speed ratio i can be returned to the low speed side quickly while avoiding the slippage of the belt 15.

The present invention is not limited to the embodiment that has been described heretofore and may be modified variously without departing from the spirit and scope thereof.

According to the present invention, no slippage of the belt occurs, the superior shift stability can be provided, and moreover, the response can be improved, thereby making it possible to realize the superior shift feeling.

Since the oil pressure can be reduced and the load of the pump can also be reduced, the durability of the belt is improved.

Since the actual primary pressure is held at the appropriate upper limit by the relieve valve, the maximum pressure of the primary circuit downstream of the relief valve can be set low, whereby the transmission can be made light in the weight and low in the cost.

The disclosure of Japanese Patent Application No. 2002-043520 filed on Feb. 20, 2002 including the specification, drawings and abstract is incorporated herein by reference in its entirety.

While the presently preferred embodiments of the present invention have been shown and described, it is to be understood that these disclosures are for the purpose of illustration and that various changes and modifications maybe made without departing from the scope of the present invention as set forth in the appended claims.

What is claimed is:

1. A shift control apparatus for a continuously variable transmission having a primary pulley provided with a primary cylinder and a secondary pulley provided with a secondary cylinder, whereby a continuously variable shifting is achieved by changing a wrap-contact diameter of a power transmission element relative to the primary pulley by supplying a primary pressure into the primary cylinder, comprising:

a target primary pressure setting unit provided a target primary pressure according to a speed ratio deviation between an actual speed ratio between the primary pulley and the secondary pulley and a target speed ratio calculated according to running conditions of a vehicle;

a shift control valve for regulating flow rate of hydraulic oil supplied to the primary cylinder by changing an opening area of the shift control valve according to current supplied to an electromagnetic coil;

a primary pressure detecting unit for detecting the primary pressure supplied to the primary cylinder; and a control unit for controlling the speed ratio by correcting a basic current on the basis of the target primary pressure and supplied to the electromagnetic coil by feeding back the primary pressure.

2. The shift control apparatus according to claim 1, wherein:

the target primary pressure is set by an oil pressure ratio and the speed ratio deviation, the oil pressure ratio being between a primary pressure in a steady state corresponding to a target speed ratio and a secondary pressure supplied to the secondary cylinder.

3. The shift control apparatus according to claim 1, wherein:

the target primary pressure is set by adding a compensation value calculated by a parameter representing operating conditions such as the speed ratio deviation.

4. The shift control apparatus according to claim 1, wherein:

the feedback correction of the primary pressure is unexecuted when the variation rate of the target primary pressure is smaller than a predetermined value and a pressure deviation between the target primary pressure and an actual primary pressure is equal to or smaller than a predetermined value.

5. The shift control apparatus according to claim 1, wherein:

the feedback correction of the primary pressure is unexecuted when the variation rate of the target speed ratio is smaller than a predetermined value and the speed ratio deviation between the target speed ratio and the actual speed ratio is equal to or smaller than a predetermined value.

6. The shift control apparatus according to claim 1, wherein:

a current resulted from adding a feedback compensation current obtained by the pressure deviation between the target primary pressure and the actual primary pressure to the basic current is supplied to the shift control valve.

7. The shift control apparatus according to claim 1, wherein:

the shift control valve is closed when the variation rate of the target primary pressure is equal to or smaller than a predetermined value, whereas the opening area of the shift control valve is regulated according to the variation rate when the variation rate is equal to or larger than the predetermined value.

8. The shift control apparatus according to claim 1, wherein:

the opening area is regulated by limiting the current supplied to the electromagnetic coil so that a shifting speed is unexcessive.

9. The shift control apparatus according to claim 8, wherein:

the current is limited according to the primary pressure.

10. The shift control apparatus according to claim 1, further comprising:

a oil pressure limiting unit for limiting the primary pressure supplied to the primary cylinder is provided in a primary oil passage connected to the primary cylinder, the oil pressure limiting unit inhibits that the primary pressure supplied to the primary cylinder exceeds a predetermined value.

11. The shift control apparatus according to claim 10, wherein:

the oil pressure limiting unit is a relief valve.

12. The shift control apparatus according to claim 10, wherein:

the oil pressure limiting unit is controlled by an output signal from the primary pressure detecting unit.

13. The shift control apparatus according to claim 1, wherein:

the amount of hydraulic oil flowed in and out of the primary cylinder is estimated by the opening area obtained from the relationship between the opening area and current and the primary pressure when the vehicle is running at a low speed, and wherein a speed ratio is controlled based on the estimated value.

14. A shift control method for a continuously variable transmission having a primary pulley with a primary cylinder and a secondary pulley with a secondary cylinder, whereby the continuously variable shifting is achieved by changing a winding diameter of a belt the primary and secondary pulleys, the method comprising steps of:

setting a target primary pressure according to a speed ratio deviation between an actual speed ratio between the primary pulley and the secondary pulley and a target speed ratio calculated according to running conditions of a vehicle;

regulating a flow rate of a hydraulic oil supplied to the primary cylinder by changing an opening area of the shift control valve according to a current supplied to an electromagnetic coil;

detecting the primary pressure supplied to the primary cylinder; and controlling the speed ratio by correcting a basic current based upon the target primary pressure and supplied to the electromagnetic coil by feeding back the primary pressure detected by the primary pressure detecting unit.

* * * * *